Patented July 16, 1946

2,404,037

UNITED STATES PATENT OFFICE 2,404,037

PROCESS OF EXTRACTING BUTTER

Loran O. Buxton, Maplewood, N. J., assignor to National Oil Products Company, Harrison, N. J., a corporation of New Jersey No Drawing. Original application August 14, 1941, Serial No. 406,831. Divided and this application July 18, 1945, Serial No. 605,846

8 Claims. (Cl. 99—118)

This invention relates in general to the treatment of butter and, more particularly, to improved concentrated butter products and to correlated improvements in the process for producing the same.

It is well known that the desirable delicate yet rich taste of many foods and food products, especially bakery products such as cakes, cookies, doughnuts and the like, is largely due to the use of butter in the preparation of said products. In addition to imparting a very desirable taste and flavor to food products by the use of butter, such use will also enhance the nutrient value of the foods since butter contains certain vitamins, notably A and D, which are essential to the health and well-being of humans.

In some cases it would be highly desirable if one could use a product which would have concentrated therein all of the flavor-imparting and vitamin constituents of butter. Furthermore, at times it would be highly desirable to have all the flavor-imparting and vitamin constituents of a certain quantity of butter incorporated into an equal or smaller quantity of a product which would remain liquid at ordinary ice box temperatures.

It has been proposed to prepare a butter concentrate by subjecting water-free butter fat to either short-path or molecular distillation. Such a process has many disadvantages. Some of the natural flavoring constituents of butter have relatively high vapor pressures; in fact, some of these constituents are volatile at less than 100° C. when under atmospheric pressure. In order to distill the vitamins in butter fat, the butter fat must be heated to temperatures of around 200° C. under a high vacuum (0.1 mm. or less). Naturally, over such a wide range of conditions it will be impossible to obtain clear-cut separation of the desired constituents but instead it can readily be seen that if such a process is used there will also be obtained in the distillate large quantities of high molecular weight glycerides which it is desired to exclude. It has been admitted by the proposers of such processes that the product obtained by such a process is not all that is to be desired as a certain amount of solids is not removed. To overcome this, successive distillations are usually carried out until the desired product is obtained. Naturally, such a process is very costly and not practical commercially.

Another disadvantage of a molecular distillation process is that in order to obtain much of the vitamin D contained in the butter, a temperature which has a very harmful and deleterious effect on vitamin A must be employed. Therefore, one must be content with a poor yield of vitamin D or else risk destroying vitamin A. Furthermore, a product produced by such a process has a tendency to be relatively unstable as a large part of the naturally occuring antioxidants in butter is left behind in the residue since a large portion thereof is nonvolatile under the temperature and pressure conditions which may be used and also, by virtue of the high temperatures which are employed, some of the antioxidants which might be distilled are destroyed in the process.

It is the object of this invention to provide an efficient and simple process for the production of a product containing in their natural condition and in concentrated form substantially all the flavor-imparting and vitamin constituents and natural antioxidants contained in butter.

Another object of this invention is to produce a product which will be liquid at ordinary ice box temperatures and which will contain in their natural condition and in concentrated form substantially all the flavor-imparting and vitamin constituents and natural antioxidants of butter.

A further object of this invention is to produce a butter concentrate which is stable towards oxidative changes.

Still another object of this invention is to produce a butter concentrate containing relatively large quantities of vitamins A and D.

Other objects of the invention will in part be obvious and will in part appear hereinafter.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

I have now discovered that if butter is contacted with a suitable solvent which is substantially miscible with the butter fat at room temperature or at temperatures substantially above room temperature and partially immiscible with butter fat at temperatures substantially below room temperature, the solvent layer which separates at the lower temperatures contains practically all the flavor-imparting and vitamin constituents and natural antioxidants of the butter in their natural unchanged condition. This solvent layer may be removed from the immiscible material and the solvent and miscible constituents separated by any suitable means, e. g., by vacuum distillation, whereby a product containing a high concentration of vitamins, natural antioxidants and flavor-imparting constituents is obtained. Substantially all the vitamin D as well as vitamin A present in the original butter are contained in the concentrate. Furthermore, the concentrate is highly resistant to oxidative changes since it has concentrated therein substantially all the natural antioxidants originally present in the butter.

In carrying out the process of my invention the solvent to be employed is selected from the class consisting of aliphatic esters containing 2 to 5 carbon atoms. Usually the solvent should be one whose vapor pressure is not any less than that of any of the constituents of the butter as in removing the solvent from the miscible portion of the butter fat, part of the flavor-imparting constituents may be lost. If desired or necessary, solvents of slightly lower vapor pressures may be used but the flavoring quality of the product obtained will not be as good as in the case where a solvent of higher vapor pressure is employed. In any event the antioxidant and vitamin content of the product will not be affected by the vapor pressure of the solvent used. Solvents which I have found to possess the foregoing characteristics and properties are those falling within the class of aliphatic esters containing 2 to 5 carbon atoms. Solvents representative of this class are methyl formate, ethyl formate, ethyl acetate, beta-hydroxy ethyl acetate and vinyl acetate.

Although it is preferred to remove most of the water from the butter before treating with the solvent, it is not absolutely necessary to do so. Occasionally it may be found that when most of the water has been removed from the butter, certain of the solvents mentioned hereinabove may be too miscible with the butter fat to produce by the process of my invention as highly a concentrated product as desired. However, this condition may be readily controlled by cooling to very low temperatures or by diluting the solvent with either a small amount of water or with some liquid organic solvent relatively immiscible with butter fat. In general it may be said that the effect of diluting any of the above solvents with water will be to render the solvents more immiscible with the butter fat, so that if difficulty is encountered in effecting proper separation of the desired products from the balance of the butter fat, this difficulty may generally be overcome by the addition of a small amount of water to the solvent.

In carrying out the preferred process of my invention butter is first melted by warming slowly, thus allowing the whey (water) portion to separate from the butter oil. The butter oil is then filtered while fluid in order to remove any traces of moisture. The relatively dry butter oil is then treated with the particular solvent to be employed. The relative proportion of oil to solvent may vary widely; preferably the ratio of solvent to oil should be greater than one and in most cases 4 to 50 parts of solvent to one part of butter oil is preferred. This solvent-butter oil mixture may then be heated until the oil or the greater part thereof is dissolved in the solvent. I prefer to form the solution of oil in the solvent by first heating the solvent to be used to a predetermined temperature at which the oil when added will substantially completely dissolve in the solvent and then adding the oil to the solvent with agitation.

The solution of the butter oil in the solvent prepared as hereinabove described may then, in accordance with the process of my invention, be permitted to cool to effect a separation of the solution of the highly concentrated butter product from the remainder of the oil. The temperature to which the solution is cooled may vary widely. In some cases it may be desirable to cool the solution to as low as −70° C. or lower. I have found, however, that proper layer formation is obtained if the mass is cooled to a temperature between about 10° and −20° C. Upon cooling, that part of the butter oil which will ordinarily solidify may be removed from the solvent-oil mixture by filtration. This solid may again be extracted as hereinabove described and the final residue which will thus be obtained is practically white in color, solid at room temperature and contains very little aroma or flavor. This residue is a pure fat which may be used as a shortening or in the production of margarine or for other similar purposes.

The combined solvent-oil extracts may then be treated in any usual manner to separate the solvent from the oil, e. g., vacuum distillation, whereby an oil is obtained which is exceedingly more potent in carotene and vitamins A and D and contains most of the flavors of the original butter. This oil also contains practically all the natural antioxidants which were originally present in the butter. Thus the concentrated product produced by the process of my invention is far more stable than the original butter.

Butter concentrates prepared as above described are especially adapted for the flavoring of foods, fortification of food products, cooking, carriers for vitamins, etc. These concentrates are liquid at ice box temperatures and may be used as such, or, if a liquid butter which is less concentrated is desired, the concentrates may be added to some bland oil, such as corn oil, cottonseed oil, soybean oil, etc., which itself is liquid at ice box temperatures. Such a liquid product is excellent for use as a cooking oil and for similar purposes and is very stable against oxidative changes.

By artificially irradiating the milk from which the butter is made or irradiating the butter itself with ultraviolet light to produce artificially activated vitamin D in the butter and then treating the butter by the process of my invention, a concentrated product is obtained which is highly potent in vitamin D besides possessing all the other desirable characteristics hereinabove mentioned.

If desired, the concentrated butter oil may be added to lard or other nonbutter fats to produce shortening agents for the preparation of high quality bakery products. For some purposes butter is not as suitable a shortening agent as some other types of oleaginous materials, e. g., hydrogenated cottonseed oil. The product of my invention may be incorporated into hydrogenated cottonseed oil or like shortening, thus producing a product having the desirable characteristics of a good shortening agent in addition to the highly valuable nutritive and flavor-imparting characteristics of butter. The product of the invention may be used in lieu of drawn (melted) butter which is usually served with various seafood dishes such as lobster and steamed clams, and other dishes such as waffles, wheat cakes, etc.

The expression "butter" is used herein to connote ordinary butter, butter fat and butter oil.

This application is a division of my application Serial No. 406,831 filed August 14, 1941.

Since certain changes in carrying out the above process and certain modifications in the products which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to my novel composition of matter herein claimed without departing from the spirit of the invention. Particularly it is to be understood that in said claims ingredients or components recited in the singular are intended to include compatible mixtures of said ingredients wherever the sense permits.

Having described my invention, what I claim as new and desire to secure by Letters Patent is:

1. A process for producing a butter concentrate, the steps of which comprise contacting butter with a solvent selected from the group consisting of aliphatic esters containing 2 to 5 carbon atoms to dissolve at least a major portion of the butter, cooling the mass to a temperature at least as low as 10° C. and separating from the mass the solvent bearing in solution a major portion of the vitamin, flavor-imparting and antioxidant constituents of the butter.

2. A process for producing a butter concentrate, the steps of which comprise contacting butter with ethyl formate to dissolve a major portion thereof, cooling the mass to a temperature below 10° C. to cause the formation of two layers and separating the ethyl formate bearing in solution a major portion of the vitamin, flavor-imparting and antioxidant constituents of the butter.

3. A process for producing a butter concentrate, the steps of which comprise contacting butter with ethyl acetate to dissolve a major portion thereof, cooling the mass to a temperature below 10° C. to cause the formation of two layers and separating the ethyl acetate bearing in solution a major portion of the vitamin, flavor-imparting and antioxidant constituents of the butter.

4. A process for producing a butter concentrate, the steps of which comprise contacting butter with vinyl acetate to dissolve a major portion thereof, cooling the mass to a temperature below 10° C. to cause the formation of two layers and separating the vinyl acetate bearing in solution a major portion of the vitamin, flavor-imparting and antioxidant constituents of the butter.

5. A process for producing a butter concentrate, the steps of which comprise dissolving at least the major portion of butter oil in a greater volume of a solvent selected from the group consisting of aliphatic esters containing 2 to 5 carbon atoms, cooling the mass to a temperature below 10° C. to cause layer formations and separating the solvent layer having dissolved therein a major portion of the vitamin, flavor-imparting and antioxidant constituents originally present in the butter oil.

6. A process for producing a butter concentrate, the steps of which comprise dissolving at least the major portion of butter oil in a greater volume of ethyl formate, cooling the mass to a temperature below 10° C. to cause layer formations and separating the ethyl formate layer having dissolved therein a major portion of the vitamin, flavor-imparting and antioxidant constituents originally present in the butter oil.

7. A process for producing a butter concentrate, the steps of which comprise dissolving at least the major portion of butter oil in a greater volume of ethyl acetate, cooling the mass to a temperature below 10° C. to cause layer formations and separating the ethyl formate layer having dissolved therein a major portion of the vitamin, flavor-imparting and antioxidant constituents originally present in the butter oil.

8. A process for producing a butter concentrate, the steps of which comprise dissolving at least the major portion of butter oil in a greater volume of vinyl acetate, cooling the mass to a temperature below 10° C. to cause layer formations and separating the vinyl acetate layer having dissolved therein a major portion of the vitamin, flavor-imparting and antioxidant constituents originally present in the butter oil.

LORAN O. BUXTON.